(12) United States Patent
Vijay et al.

(10) Patent No.: US 8,424,000 B2
(45) Date of Patent: *Apr. 16, 2013

(54) PROVIDING APPLICATION HIGH AVAILABILITY IN HIGHLY-AVAILABLE VIRTUAL MACHINE ENVIRONMENTS

(75) Inventors: Jog Rohit Vijay, Maharashtra (IN); Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/847,030

(22) Filed: Jul. 30, 2010

(65) Prior Publication Data

US 2012/0030670 A1    Feb. 2, 2012

(51) Int. Cl.
*G06F 9/455* (2006.01)
*G06F 11/00* (2006.01)

(52) U.S. Cl.
USPC .................................... 718/1; 714/23; 714/37

(58) Field of Classification Search .................. None
See application file for complete search history.

(56) References Cited

U.S. PATENT DOCUMENTS

| 6,691,244 B1* | 2/2004 | Kampe et al. ................. 714/4.1 |
| 7,213,246 B1* | 5/2007 | van Rietschote et al. ......... 718/1 |
| 7,478,149 B2* | 1/2009 | Joshi et al. .................... 709/223 |
| 7,529,822 B2* | 5/2009 | Joshi et al. .................... 709/223 |
| 7,797,587 B2* | 9/2010 | Vasudevan et al. .......... 714/47.1 |
| 8,184,776 B2* | 5/2012 | Yuan ............................. 378/157 |
| 8,209,684 B2* | 6/2012 | Kannan et al. .................... 718/1 |
| 8,219,990 B2* | 7/2012 | Khanna ............................. 718/1 |
| 2002/0194319 A1* | 12/2002 | Ritche .......................... 709/223 |
| 2004/0153708 A1* | 8/2004 | Joshi et al. ....................... 714/4 |
| 2008/0104586 A1* | 5/2008 | Thorton et al. .................... 718/1 |
| 2008/0307259 A1* | 12/2008 | Vasudevan et al. ............. 714/23 |
| 2010/0037089 A1* | 2/2010 | Krishnan et al. .................. 714/5 |

OTHER PUBLICATIONS

Hughes-Fenchel Greg; "A Flexible Clustered Approach to High Availability," Fault-Tolerant Computing; FTCS-27 Digest of Papers; Jun. 24-27, 1997, pp. 314-318.
"Veritas Cluster Server 3.5," User's Guide, Solaris, Jul. 2002, Retrieved from Internet: URL: http://ftp.support.veritas.com/pub/support/prdocuts/ClusterServer_UNIX/24975.pdf; pp. 11-21.

* cited by examiner

*Primary Examiner* — Jennifer To
(74) *Attorney, Agent, or Firm* — Campbell Stephenson LLP

(57) ABSTRACT

Various systems and methods can provide high availability of an application executing in a highly-available virtual machine environment. One method involves receiving information indicating a state of an application executing in a virtual machine from a monitoring agent executing in the virtual machine. In response to receiving the information, the method involves determining whether the virtual machine should be restarted. Based upon that determination, the method then determines whether the monitoring agent should send a heartbeat message to a virtualization controller prior to expiration of a timeout interval. The virtualization controller is configured to restart the virtual machine if the virtual machine does not send the heartbeat message prior to expiration of the timeout interval.

16 Claims, 6 Drawing Sheets

PROVIDING APPLICATION HIGH AVAILABILITY IN HIGHLY-AVAILABLE VIRTUAL MACHINE ENVIRONMENTS

FIELD OF THE INVENTION

This invention relates to high availability and, more particularly, to providing highly available applications in virtual machines.

DESCRIPTION OF THE RELATED ART

Virtualization systems allow multiple operating systems (which can actual be separate instances of the same type of operating system) to execute during the same time period on the same hardware. Each executing operating system acts as an independent "virtual machine" and can be interacted with and used in substantially the same manner as standalone operating system executing on independent hardware. Virtual machines allow increased usage of hardware resources by effectively turning one hardware computing device into several virtual machines.

Some virtualization systems provide a virtualization controller that can manage one or more virtual machines implemented on one or more computing devices. Such a virtualization controller can communicate with the virtual machines and control the operation of those virtual machines. In some environments, the virtualization controller can even manage the virtual machines in a manner that provides high availability of the virtual machines, such that if a particular virtual machine experiences a failure, the virtualization controller can restart that failed virtual machine on another computing device. Unfortunately, in conventional virtualization systems that provide highly available virtual machines, it may not be possible to also efficiently make an application that executes within a virtual machine highly available.

SUMMARY OF THE INVENTION

Various systems and methods for providing high availability of an application executing in a highly-available virtual machine environment are disclosed. For example, one method involves receiving information indicating a state of an application executing in a virtual machine from a monitoring agent executing in the virtual machine. In response to receiving the information, the method involves determining whether the virtual machine should be restarted. Based upon that determination, the method then determines whether the monitoring agent should send a heartbeat message to a virtualization controller prior to expiration of a timeout interval. The virtualization controller is configured to restart the virtual machine if the virtual machine does not send the heartbeat message prior to expiration of the timeout interval. The operation of determining whether to send the heartbeat message is performed by a computing device. In some embodiments, the operation of determining is performed by a computing device implementing a decision-making agent, which is not executing in the virtual machine.

The received information can identify an operating status of each of several applications executing in the virtual machine. The determination as to whether to restart the virtual machine can be based upon the operating status and a priority of each of the applications.

As examples, the method can determine that the virtual machine should not be restarted, in response to the information identifying that a higher-priority application of the plurality of applications is executing properly and a lower priority application of the plurality of applications is failed. Alternatively, the method can determine that the virtual machine should be restarted, in response to the information identifying that a higher-priority application of the plurality of applications is failed and a lower priority application of the plurality of applications is executing properly. In one embodiment, the method can determine the monitoring agent should first attempt to restart the application, in response to the information identifying that the application is not operating properly, where the attempt to restart the application takes place prior to the determination as to whether the virtual machine should be restarted.

The method can decide to unregister the monitoring agent from providing heartbeat messages to the virtualization controller, in response to the information identifying that the application has been intentionally taken offline. The monitoring agent can continue to monitor the application, after the monitoring agent has unregistered. The method can decide to reregister the monitoring agent to provide heartbeat messages to the virtualization controller, in response to the information identifying that the application is again online.

The method can involve receiving information from an administrator. The information can indicate, for example, whether the application has been intentionally taken offline and/or whether the monitoring agent should continue to monitor the application.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
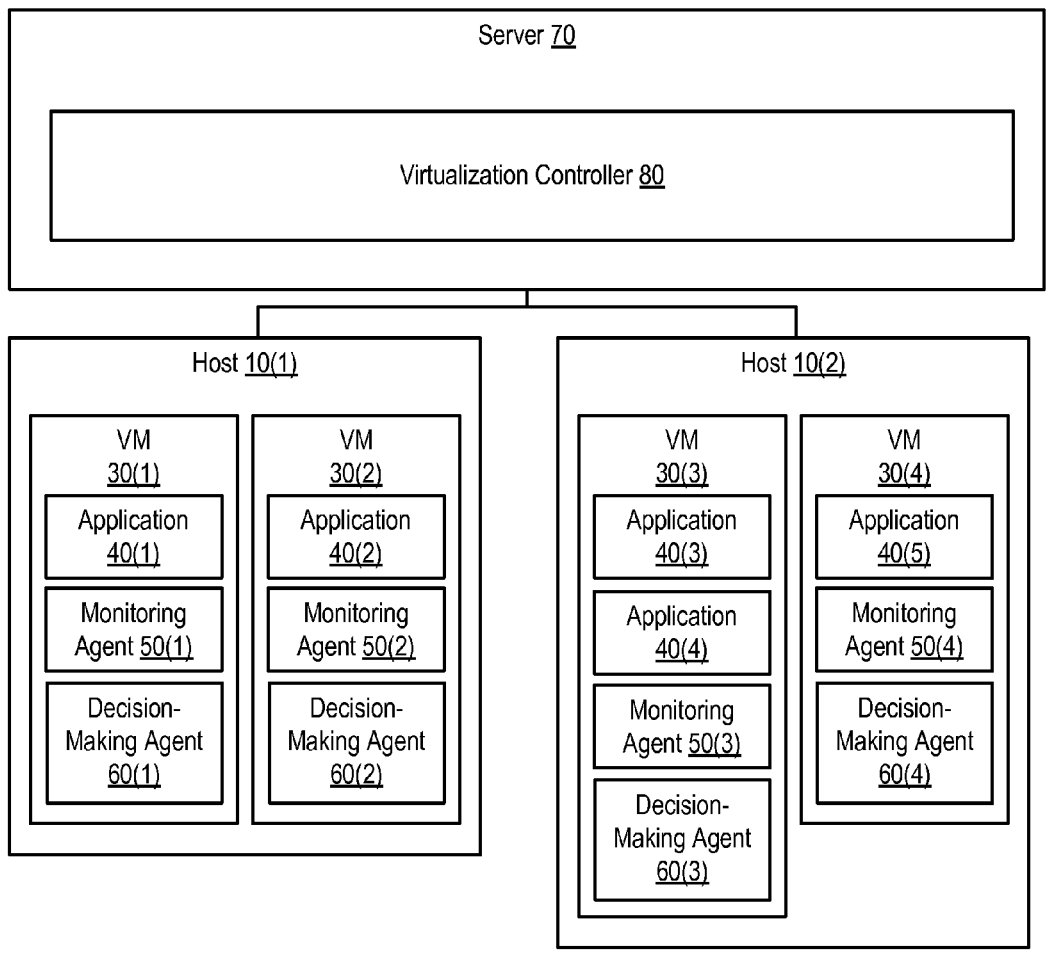
FIG. 1 is a block diagram of a system that provides high availability of applications in a highly-available virtual machine environment, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a virtualization system. As shown, the virtualization system includes two hosts 10(1) and 10(2). In this example, each host implements two virtual machines (VMs). As shown, host 10(1) implements VM 30(1) and VM 302(2). Similarly, host 10(2) implements VM 30(3) and VM 30(4). It is noted that alternative embodiments can implement different numbers of VMs per host than shown in this example, and the same system can include one or more hosts that each implement a different number of VMs than other hosts within the same system.

The virtual machines VM 30(1)-VM 30(4) each provide a self-contained instance of an executing operating system. VMs executing on the same host can be implemented using the same or different operating systems. A client interacting with a VM will typically interact in exactly the same manner that a client would interact with a standalone operating system operating on independent hardware. The virtual machines can be implemented using virtualization software such as that provided by VMware, Inc. of Palo Alto, Calif.

An application executes within each of the VMs. Such an application can be a database application, a mail server, or the like. Here, application 40(1) executes in VM 30(1), application 40(2) executions in VM 30(2), applications 40(3) and 40(4) execute in VM 30(3), and application 40(5) executes in VM 30(4). As shown, multiple applications can execute within a single VM. The type of application executing on a given VM can be the same or different than the type of application executing on another VM within the same virtualization system.

A monitoring agent (a special type of application) also executes within each VM. Each monitoring agent is configured to monitor the state of one or more applications executing within the same VM and to report the state of the monitored application(s) to a decision-making agent. As shown, monitoring agent 50(1) executes in VM 30(1) and monitors the state of application 40(1). Monitoring agent 50(2) executes in VM 30(2) and monitors the state of application 40(2). Monitoring agent 50(3) executes in VM 30(3) and monitors the state of each of applications 40(3) and 40(4). Monitoring agent 50(4) executes in VM 30(4) and monitors the state of application 40(5). While FIG. 1 illustrates an embodiment in which a single monitoring agent that can monitor multiple applications, alternative embodiments may employ multiple monitoring agents per VM, such that there is a one-to-one correspondence between applications being monitored and monitoring agents. It is noted that a monitoring agent can be configured to monitor fewer than all applications executing in a given VM.

In some embodiments, the monitoring agents are implemented as VERITAS Cluster Server (VCS) agents, available from Symantec, Corp. of Cupertino, Calif. In such embodiments, each VM can be configured as an independent single-node cluster. The monitoring agent can be configured as a monitoring service group of the single-node cluster. Each application to be monitored in the VM is also configured as a service group of the single-node cluster. The monitoring service group monitors the state of the other service groups within the same single-node cluster.

A decision-making agent (another special type of application) executes within each VM. The decision-making agent is configure to determine which actions, if any, should be taken, based upon the state of one or more applications, as identified by one or more corresponding monitoring agents. The operation of the decision-making agent is described in more detail below. As shown, decision-making agent 60(1) executes in VM 30(1), decision-making agent 60(2) executes in VM 30(2), decision-making agent 60(3) executes in VM 30(3), and decision-making agent 60(4) executes in VM 30(4). In some embodiments, the functionality of the monitoring agent and the decisional-making agent may be combined into a single agent that executes within each VM.

Hosts 10(1) and 10(2) are coupled to communicate (e.g., via a network) with server 70, which implements a virtualization controller 80. Virtualization controller 80 controls the VMs implemented on hosts 10(1) and 10(2). As such, virtualization controller 80 monitors the state of each VM to identify whether each VM is executing properly. In response to detecting the failure of a VM, virtualization controller 80 can take action to rectify the situation. Such actions can include restarting the failed VM on the same or another host or attempting to correct the problem leading to the failure.

Virtualization controller 80 can be implemented as VMware vCenter Server™ in some embodiments. In such embodiments, virtualization controller 80 can communicate with VMs via the heartbeat channel provided by VMware Tools™, which can be installed and executing within each VM. The mechanism used to restart VMs on another host in such embodiments can be vMotion™. These features can be implemented using virtualization software such as that provided by VMware, Inc. of Palo Alto, Calif.

Here, virtualization controller 80 relies upon a heartbeat message from each VM to determine the state of that VM. An application (e.g., the monitoring agent, as described in more detail below) on each VM registers with virtualization controller 80, indicating that the registered application will be sending heartbeats to virtualization controller 80. While in a state of receiving heartbeats from a particular VM, virtualization controller 80 expects to receive a heartbeat once per period (also referred to as a timeout interval) from that particular VM. If a heartbeat is not received within a given period (or if a series of heartbeats is not received over successive periods), virtualization controller 80 will determine that the VM has failed and will take corrective action (e.g., by restarting the VM on another host).

In order to provide high availability of applications executing within the virtualization environment of FIG. 1, each monitoring agent will register with virtualization controller 80 to provide heartbeats for its VM. Thus, monitoring agent 50(1) will register to provide heartbeat messages for VM 30(1), monitoring agent 50(2) will register to provide heartbeat messages for VM 30(2), monitoring agent 50(3) will register to provide heartbeat messages for VM 30(3), and monitoring agent 50(4) will register to provide heartbeat messages for VM 30(4).

As described above, monitoring agents 50(1)-50(4) will monitor applications and report the status of those applications to a respective one of decision-making agents 60(1)-60(4). Based upon the state of the monitored applications on a particular VM, the decision-making agent in that VM will decide whether the application should be restarted, whether the VM should continue to be monitored by virtualization controller, and whether the heartbeat message for the VM should be sent. The decision-making agent then reports its decision to the monitoring agent, which will take the decided-upon action.

For each monitored application within the same VM as a monitoring agent, the monitoring agent can detect whether that application is executing properly. In at least some embodiments, a monitoring agent can also distinguish between whether a non-executing application is not executing due to failure or due to being intentionally taken offline. For example, a monitoring agent can provide an interface (e.g., a graphical user interface, command line interface, or the like) via which an administrator can inform the monitoring agent that an application is being taken offline, and the monitoring agent can, in response, update state information associated with the application to indicate that the application is intentionally offline. It is noted that the administrator can take the application offline or back online (and identify that action via the interface) at any time, regardless of the current operating state detected by the monitoring agent.

When the monitoring agent detects that an application is not executing, the monitoring agent can check (e.g., by accessing stored information associated with the application) to see whether an administrator indicated that the application was being taken offline prior to the application ceasing execution. When an application is restarted after being intentionally taken offline, the administrator can again (e.g., via the interface) inform the monitoring agent about the change in application status. Alternatively, the monitoring agent can simply detect that the application has been restarted the next heartbeat period and clear any state information previously associated with that application.

Thus, the monitoring agent identifies whether each monitored application is executing properly or not. If not, the monitoring agent, at least in some embodiments, further distinguishes whether the application is not executing due to failure or due to being intentionally taken offline. The monitoring agent can generate information describing the application and its detected execution state and provide this information to the decision-making agent. For example, monitoring agent 50(1) can detect that application 40(1) has failed and can send information indicating that application 40(1) is failed to decision-making agent 60(1).

In response to receiving information describing the state of each application (e.g., online, failed, or intentionally taken offline) from a monitoring agent, a decision-making agent decides what action to take. If there is only a single monitored application in the VM, the decision-making agent will decide to send the heartbeat message (ensuring that the virtualization controller doesn't restart the VM) if the application is executing normally. If the application has failed, the decision-making agent will decide to inhibit sending the heartbeat message, which will cause the virtualization controller to restart the VM in which the failed application was executing, which effectively restarts the failed application within the restarted VM.

If the application has been intentionally taken offline (i.e., if the application is not executing but has not experienced a failure), the decision-making agent can decide that the monitoring agent should deregister from providing heartbeats to the virtualization controller. The monitoring agent can deregister by sending a request to deregister to the virtualization controller. Deregistering effectively takes the deregistered VM out of the set of VMs being monitored for high availability. The virtualization controller will no longer expect to receive regular heartbeat messages from the VM and will not restart the VM when heartbeats are not received from the VM.

The interface (e.g., used to allow an administrator to indicate when an application is intentionally being taken offline) can also allow an administrator to specify when the monitoring agent should reregister. For example, the administrator can specify whether the monitoring agent should reregister heartbeat messages when the application comes back online. If, for example, an application is being taken offline to be upgraded, the administrator can specify that deregistration should be temporary. If instead the application is being taken offline because that application will no longer be used to provide a service, the administrator can specify that deregistration should be permanent.

The monitoring agent can obtain and report the state of each monitored application once per heartbeat period. Similarly, the decision-making agent can receive the information and generate a decision based upon that information once per heartbeat period. In periods in which the monitoring agent is not registered to send heartbeats to the virtualization controller, the monitoring agent can nevertheless continue to monitor the state of the application(s) and reporting application status to the decision-making agent. Similarly, once per period, the decision-making agent can receive information from the monitoring agent and use that information to make a decision as to what action to take (e.g., send heartbeat, do not send heartbeat, or deregister). By continuing to monitor the applications even while deregistered, the monitoring agent can detect when an application is brought back online. In response to that activity being detected, the decision-making agent may cause the monitoring agent to reregister to send heartbeat messages to the virtualization controller.

If multiple applications are being monitored, the monitoring agent will report the status of each monitored application to the appropriate decision-making agent, which when then decide which action to take based upon the status and a priority of each application. The application priorities can be configured by an administrator (e.g., by entering information via a command line interface or a graphical user interface) and stored by the decision-making agent.

In general, a decision-making agent will give more weight to the status of a higher priority application than a lower priority application when making its decision. Any of a variety of different algorithms that takes application priority into account can be used to implement this process. For example, a simple algorithm can simply evaluate the status of the highest priority application and make the determination based on that application's status. If the highest priority application is executing properly, the decision-making agent can decide that the monitoring agent should send the heartbeat, regardless of the state of any lower priority application Similarly, even if all lower priority applications are operating properly, the decision-making agent can decide that the monitoring agent should not send the heartbeat message if the highest priority application has failed. In this example, all of the weight is given to the status of the highest priority application.

Other algorithms can allocate more weight to lower priority applications than the above example, which allocated no weight to any application other than the highest priority one. For example, one algorithm can compare the sum of the priorities of the VM to the sum of the priorities of the properly executing applications being monitored within the VM. If the sum corresponding to failed applications is greater, the decision-making agent can decide to stop sending the heartbeat. Similarly, if the sum corresponding to properly executing applications is greater, the decision-making agent can decide to continue sending the heartbeat. If the sums are equal, the decision-making agent can, in one embodiment, decide to stop sending the heartbeat. Another algorithm can compare the sum of priorities of properly executing and intentionally offlined applications to the sum of priorities of failed applications. If the former sum is greater, the decision-making agent will cause the monitoring agent to continue to send the heartbeat. If the latter sum is greater, the decision-making agent will prevent the heartbeat from being sent.

By compressing the states of multiple applications into a single heartbeat communication channel, the decision-making agent effectively multiplexes multiple application states into a single heartbeat message on a single communication channel. This allows the system to provide high availability of multiple applications, based on the configured priorities, despite there only being a single heartbeat communication channel.

In the above examples, if an application is failed, the standard response is to stop sending the heartbeat message, thus causing the VM in which the failed application executes to be restarted. In other embodiments, instead of automatically causing the VM containing the failed application to be restarted, the decision-making agent may instead first decide that the monitoring agent should attempt to restart the failed application. The decision-making agent can be configured (e.g., by an administrator entering information via an interface) with a maximum number of retry attempts to allow that can control the number of times this decision is reached for a failed application before the decision-making agent decides that the VM should be restarted. In order to give the application time to restart, the decision-making agent may instruct the monitoring agent to deregister with the virtualization controller while the monitoring agent attempts to restart the application.

As noted above, various information used to control each decision-making agent can be configured by an administrator entering information via an interface. This information can vary from VM to VM and from application to application. Thus, in one VM, an administrator can select to have Application A have a higher priority than was assigned to an instance of Application A in another VM.

Figure 2:
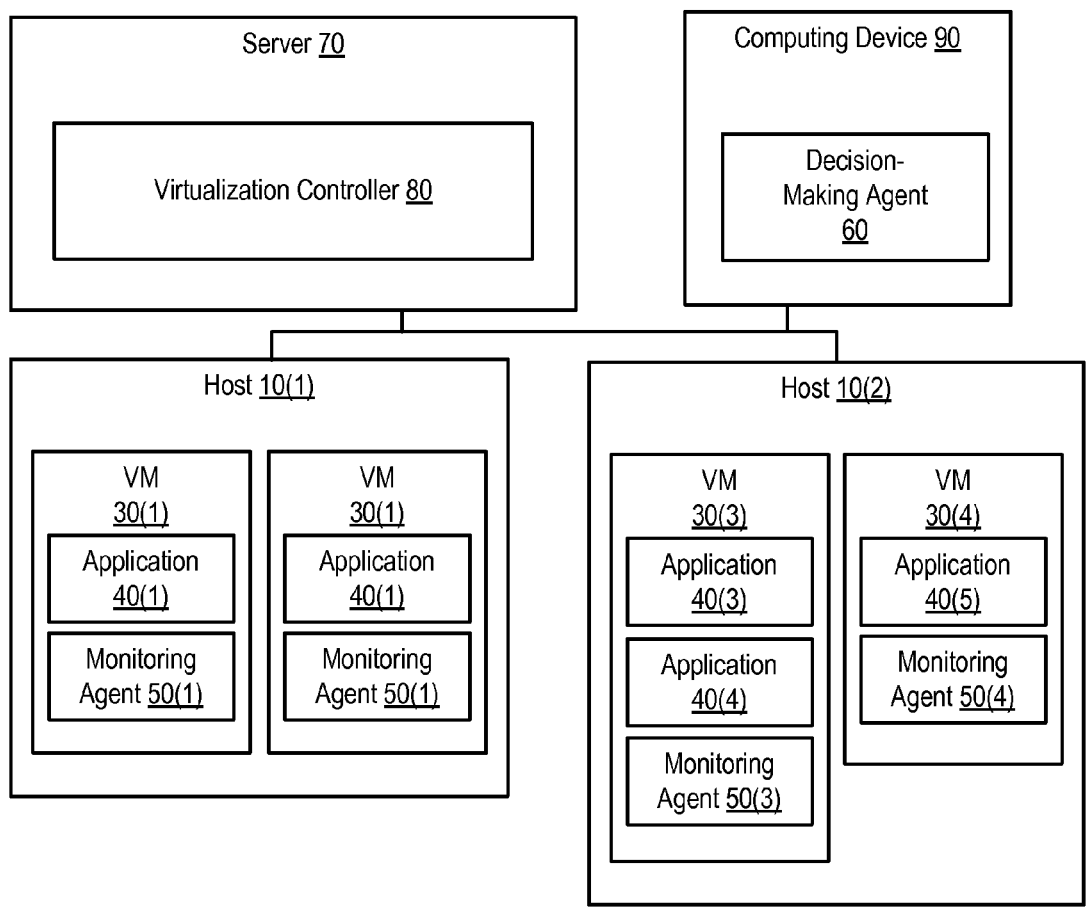
FIG. 2 is a block diagram of another system that provides high availability of applications in a highly-available virtual machine environment, according to another embodiment of the present invention.

FIG. 2 shows another example of a virtualization system. This example illustrates how the functionality of the monitoring agents and decision-making agents can be separated, such that the decision-making agent executes on a different computing device than the monitoring agents. Furthermore, this example illustrates that there need not be a one-to-one correspondence between monitoring agents and decision-making agents.

In the example of FIG. 2, server 70 and hosts 10(1) and 10(2) are configured in a similar manner to that illustrated in FIG. 1. However, instead of an independent decision-making agent executing within each VM, a separate decision-making agent 60 executes on computing device 90, which is coupled to communicate with hosts 10(1) and 10(2). In this example, each monitoring agent 50(1)-50(4) is configured to send the information generated by that monitoring agent to the single decision-making agent 60, which then processes that information to generate a decision, using techniques like those described above. Decision-making agent 60 then returns information describing its decision to the appropriate monitoring agent. For example, in response to receiving information from monitoring agent 50(3) indicating that application 40(4), which has a higher priority than application 40(3), has failed, decision-making agent 60 can decide that monitoring agent 50(3) should stop sending heartbeat messages to virtualization controller 70. In response to receiving information identifying this decision, monitoring agent 50(3) will cease sending heartbeat messages to virtualization controller 80, which will in turn cause virtualization controller 80 to restart VM 30(3) on a different host (e.g., host 10(1)).

As in the example of FIG. 1, an administrator can configure decision-making agent 60 with various priorities for the different applications on each VM. The administrator can provide different information for each application and for each VM. Decision-making agent can select which priorities and other information (e.g., such as number of times to attempt to restart an application before deciding to failover the VM in which the failed application executes) to use to process a given set of information received from a monitoring agent based upon which monitoring agent sent the information. Thus, in response to receiving information from monitoring agent 50(1), decision-making agent 60 can select to use the information associated with VM 30(1) to process the received information.

Figure 3:
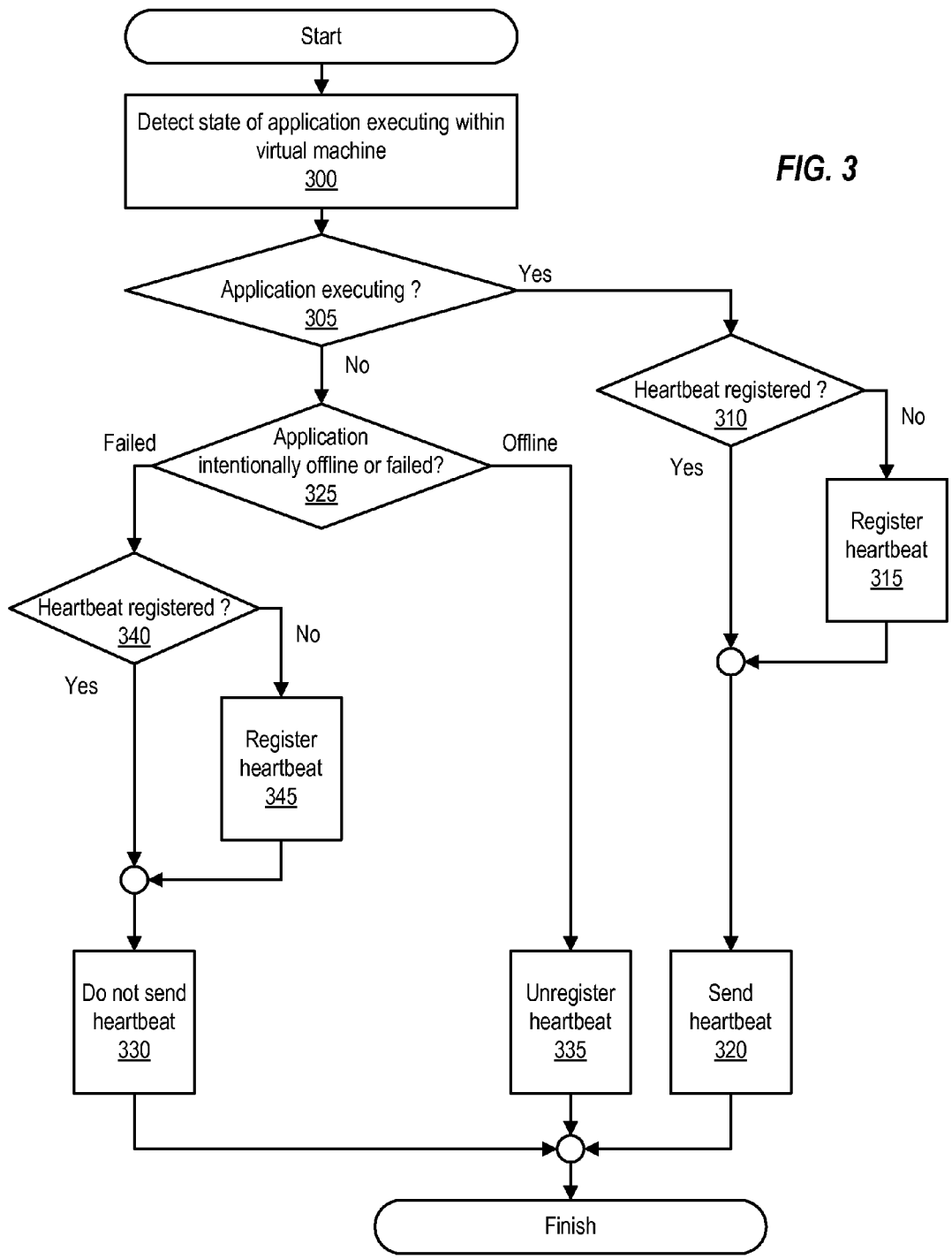
FIG. 3 is a flowchart of a method of providing high availability of an application in a highly-available virtual machine environment, according to one embodiment of the present invention.

FIG. 3 illustrates a method of providing a highly available application within a virtualization environment. This method can be performed by a monitoring agent operating in conjunction with a decision-making agent. As illustrated above, these components may or may not be executing on the same computing device as each other.

The method begins when a monitoring agent executing within a virtual machine detects the state of an application executing within the virtual machine, as shown at 300. Performance of operation 300 may involve a monitoring service group agent monitoring the status of another service group that includes the application being monitored. Information describing the results of operation 300 can be sent from the monitoring agent to a decision-making agent, which may or may not be integrated with the monitoring agent.

If the monitored application is executing properly, as determined at 305, a determination can be made as to whether the monitoring agent is currently registered to provide heartbeat messages to a virtualization controller that monitors the virtual machine, as shown at 310. Operations 305 and 310 can be performed by a decision-making agent that processes information generated by a monitoring agent.

If the monitoring agent is not currently registered to provide heartbeat messages, the monitoring agent will register to provide heartbeat messages, as shown at 315, and then send the heartbeat for the current period. If the monitoring agent is currently registered to provide the heartbeat, the monitoring agent will send the heartbeat message for the current period to the virtualization controller, as shown at 320. Performance of operations 315 and 320 can involve a decision-making agent deciding the action to take and communicating that decision to the monitoring agent, and then the monitoring agent taking the action selected by the decision-making agent.

If the application is not executing properly, a decision can be made as to whether the application is failed or has been intentionally taken offline, as shown at 325. Performance of operation 325 can involve a monitoring agent detecting the state of the application (e.g., using information entered by an administrator in the case of the application having been intentionally taken offline) and a decision-making agent processing that information.

If the application is failed, the monitoring agent will register to provide heartbeats (if not already registered), as shown at 340 and 345. The monitoring agent will then not send a heartbeat message to the virtualization controller, as shown at 330.

If instead the application has been intentionally taken offline, the monitoring agent will unregister from sending heartbeats to the virtualization controller, as shown at 335. Performance of operations 330 and 335 can involve a decision-making agent deciding the action to take and communicating that decision to the monitoring agent, and then the monitoring agent taking the action selected by the decision-making agent.

The method of FIG. 3 (and, similarly, the method of FIG. 4 described below) can be repeated once per heartbeat period. Thus, as an example, in one period, an application can be detected to be operating properly, and the next period, the same application can be detected to have been intentionally offlined. In response, the monitoring agent can deregister. Several periods after that, the application can again be detected to be online and the monitoring agent can register to again provide heartbeats. Sometime after that, the monitoring agent can detect that the application has failed, and the monitoring agent can cause the application to be restarted (by causing the virtual machine in which the application executes to be restarted) by ceasing to send heartbeats.

Figure 4:
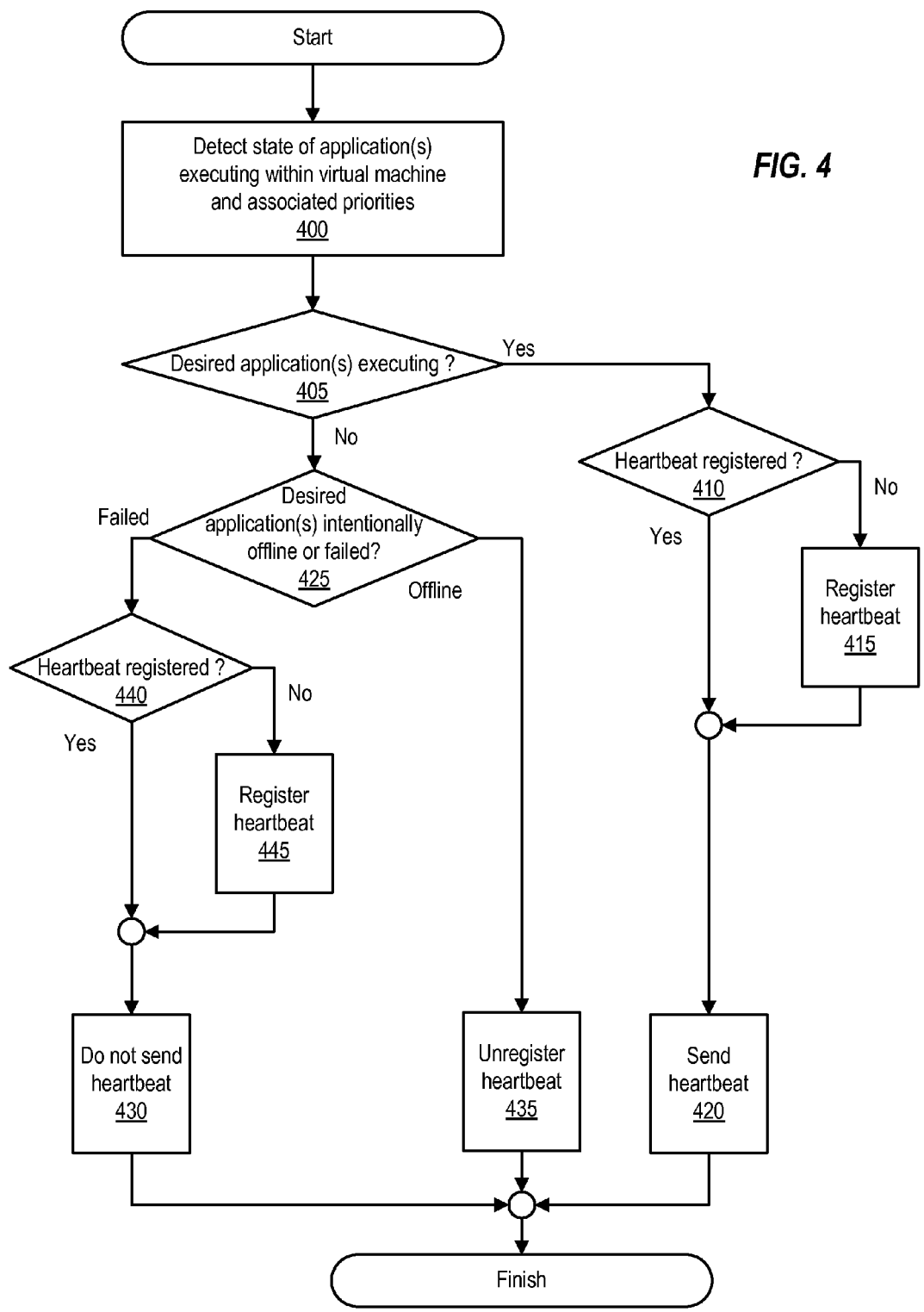
FIG. 4 is a flowchart of a method of determining whether to allow a heartbeat signal to be sent to a virtualization controller from a virtual machine executing multiple monitored applications, according to one embodiment of the present invention.

FIG. 4 is an example of a method of providing high availability of multiple applications in a virtualization environment. Like the method of FIG. 3, this method can be performed by a monitoring agent operating in conjunction with a decision-making agent.

The method of FIG. 3 begins at 400, when a monitoring agent detects the operating state (e.g., executing properly, failed, or intentionally taken offline) of each of several monitored applications executing within the same virtual machine as the monitoring agent. A decision-making agent can also detect the priorities of each of those monitored applications (e.g., by accessing configuration information entered by an administrator).

At 405, the decision-making agent uses information identifying the operating states of the applications and the priorities to determine whether a desired set of one or more applications is executing properly. The decision-making agent can use one of the algorithms described above to reach this decision, or any other algorithm that takes the application priorities into account.

If the desired applications are executing and the monitoring agent is currently registered to provide heartbeats for the virtual machine to the virtualization controller, the decision-making agent decides that the monitoring agent should send a heartbeat message for the current period, as shown at 420. If the monitoring agent is not currently registered, the monitoring agent will register (415) and then send the heartbeat message (420).

If the desired applications are not executing properly, the decision-making agent can determine (e.g., by looking at the operating status of the highest priority application, by comparing the sums of priorities of failed and intentionally offlined applications, or the like) whether the desired applications are failed or have been intentionally taken offline, as shown at 425. If the desired applications are failed, the monitoring agent will register to provide heartbeats (if not already registered), as shown at 440 and 445. The decision-making agent can cause the monitoring agent to not send a heartbeat message for the current period (430), which in turn causes the virtualization controller to restart the VM in which the failed applications executed to be restarted on another host. If the desired applications have instead been intentionally taken offline, the decision-making agent can cause the monitoring agent to deregister with the virtualization controller, as shown at 435.

Figure 5:
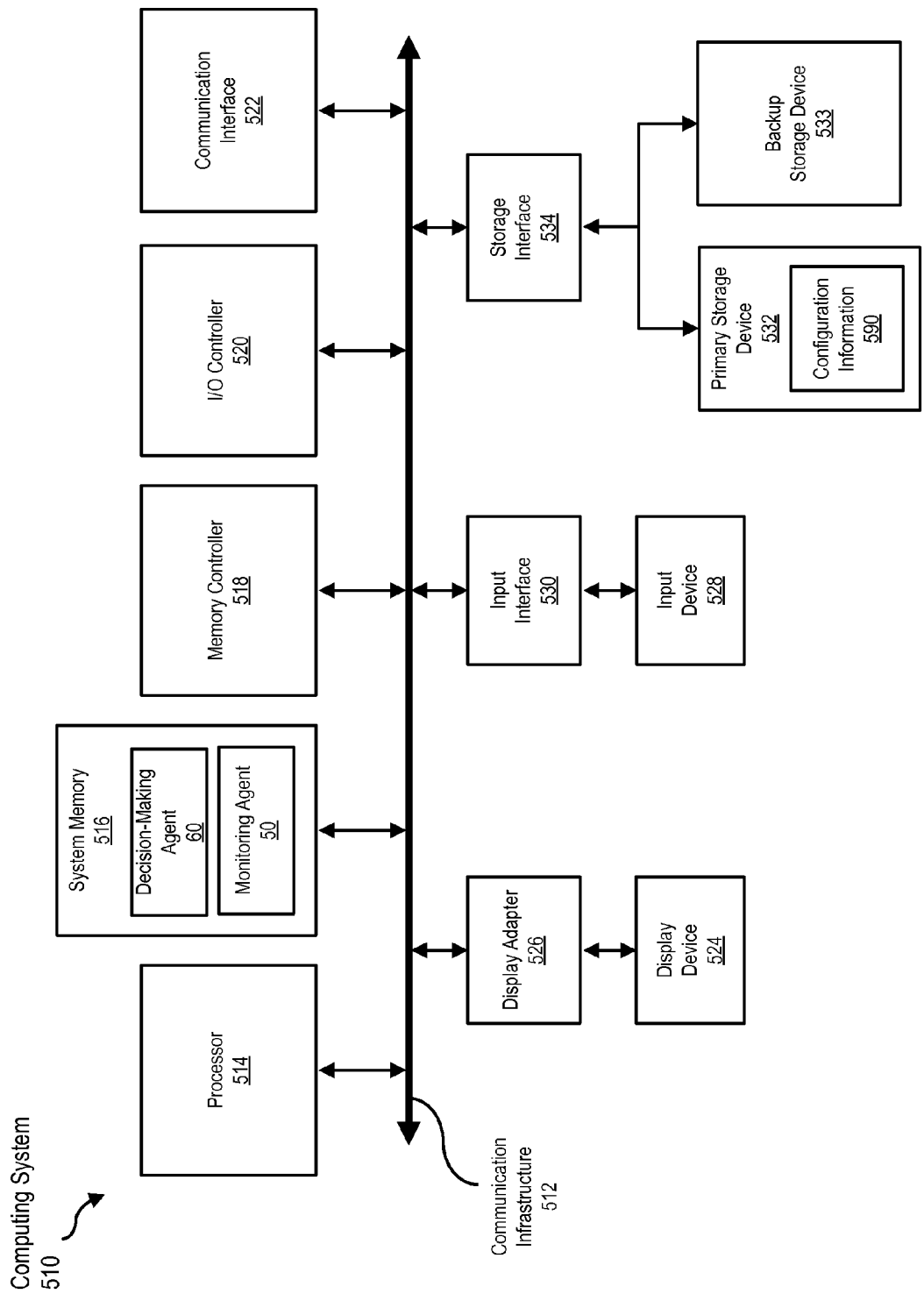
FIG. 5 is a block diagram of a computing device, illustrating how a monitoring agent and a decision-making agent can both be implemented in software, according to one embodiment of the present invention.

FIG. 5 is a block diagram of a computing system 510 capable of implementing a monitoring agent and/or a decision-making agent as described above. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, hand-held devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a monitoring agent and/or a decision-making agent, computing system 510 becomes a special purpose computing device that is configured to provide high availability of one or more applications within a virtualization environment.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of a monitoring agent 50 (e.g., one of monitoring agents 50(1)-50(4) from FIGS. 5 and 2) or decision-making agent 60 (e.g., one of decision-making agents 60(1)-60(4) of FIG. 1 or decision-making agent 60 of FIG. 2) may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 530. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. A storage device like primary storage device 532 can store information such as configuration information 590 (e.g., configuration information indicating the priority of applications and the number of retry attempts per application, as described above).

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
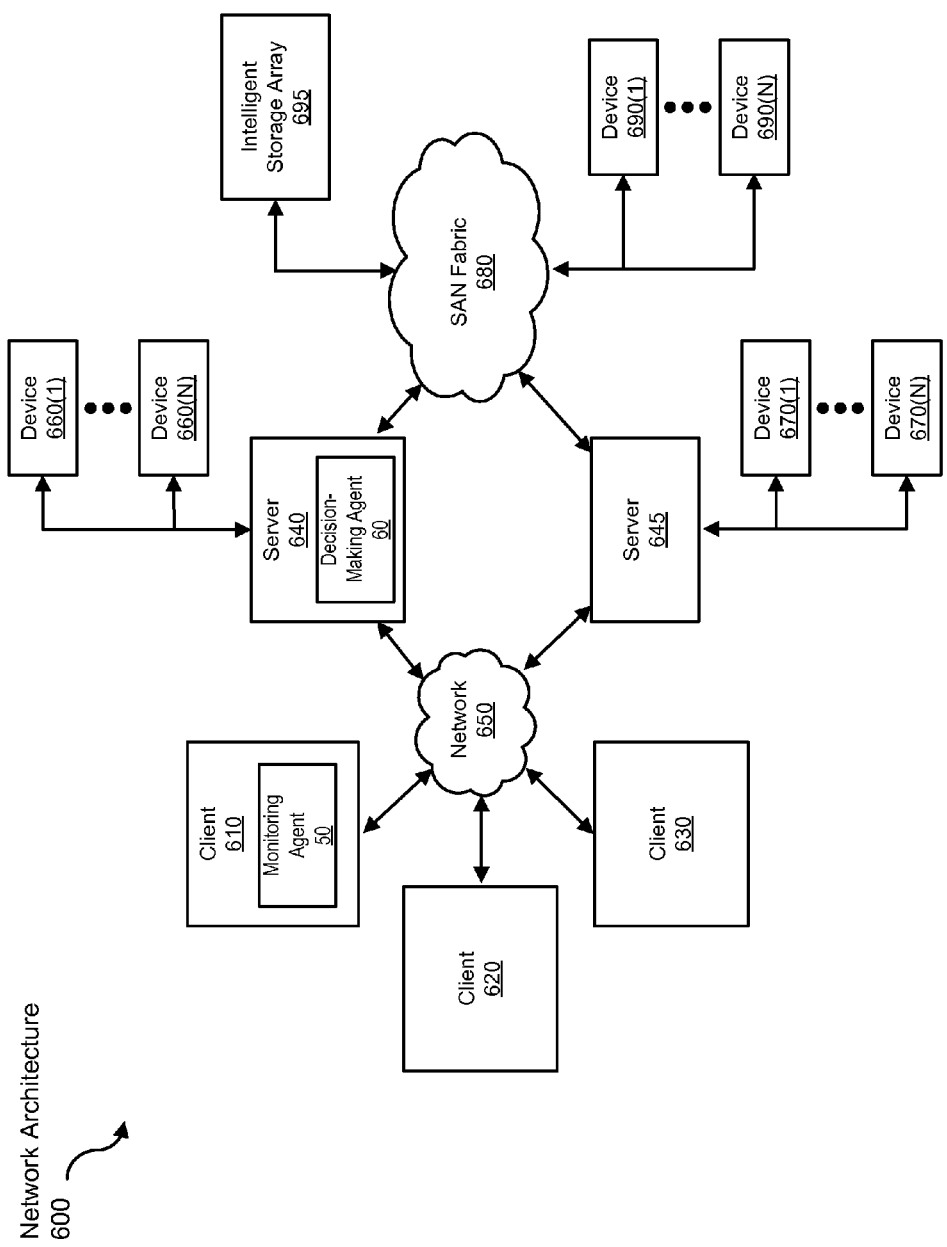
FIG. 6 is a block diagram of a networked system, illustrating how various computing devices can communicate via a network, according to one embodiment of the present invention.

FIG. 6 is a block diagram of an network architecture 600 in which client systems 610, 620, and 630 and servers 640 and 645 may be coupled to a network 650. Client systems 610, 620, and 630 generally represent any type or form of computing device or system, such as computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include monitoring agents and/or decision-making agents as shown in FIGS. 1 and 2.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a decision-making agent, operating in conjunction with a monitoring agent, may transform the configuration of a virtualization system by controlling the transmission of heartbeat messages in a manner that causes a virtual machine to be restarted on another host.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving information indicating an operating state of each of a plurality of applications executing in a virtual machine from a monitoring agent executing in the virtual machine;
    determining a priority of each of the plurality of applications by a decision-making agent, wherein the decision-making agent is not executing in the virtual machine;
    determining whether a desired set of applications of the plurality of applications is executing properly based on the received operating state of each of the plurality of applications and the determined priority of each of the plurality of applications;
    generating a decision as to whether the virtual machine should be restarted based on the determining whether the desired set of applications of the plurality of applications is executing properly;
    detecting whether the monitoring agent is registered to provide heartbeat messages to a virtualization controller;
    preventing, based on the detecting whether the monitoring agent is registered and the generated decision, the monitoring agent from transmitting a heartbeat message to the virtualization controller prior to expiration of a timeout interval, wherein
        the heartbeat message identifies the operating state of each of the plurality of applications, the decision-making agent multiplexes multiple application states into a single heartbeat message, the virtualization controller is configured to restart the virtual machine if the monitoring agent does not send the heartbeat message prior to expiration of the timeout interval, and the preventing is performed by a computing device; and restarting the virtual machine, wherein the restarting is performed in response to the preventing.

2. The method of claim 1, further comprising determining that the virtual machine should not be restarted, in response to the information identifying that a higher-priority application of the plurality of applications is executing properly and a lower priority application of the plurality of applications is failed.

3. The method of claim 1, further comprising determining that the virtual machine should be restarted, in response to the information identifying that a higher-priority application of the plurality of applications is failed and a lower priority application of the plurality of applications is executing properly.

4. The method of claim 1, further comprising deciding that the monitoring agent should attempt to restart the application, in response to the information identifying that the application is not operating properly, wherein the attempting to restart the application is performed prior to the determining generating the decision as to whether the virtual machine should be restarted.

5. The method of claim 4, further comprising deciding to unregister the monitoring agent from providing heartbeat messages to the virtualization controller, in response to the information identifying that the application has been intentionally taken offline.

6. The method of claim 5, further comprising the monitoring agent continuing to monitor the application, after the monitoring agent has unregistered.

7. The method of claim 5, further comprising deciding to reregister the monitoring agent to provide heartbeat messages to the virtualization controller, in response to the information identifying that the application is again online.

8. The method of claim 1, further comprising receiving information from an administrator, wherein the information indicates at least one of whether the application has been intentionally taken offline and whether the monitoring agent should continue to monitor the application.

9. A system comprising:
one or more processors; and
memory coupled to the one or more processors and storing program instructions executable by the one or more processors to:
receive information indicating an operating state of each of a plurality of applications executing in a virtual machine from a monitoring agent executing in the virtual machine;
determine a priority of each of the plurality of applications by a decision-making agent, wherein the decision-making agent is not executing in the virtual machine;
determine whether a desired set of applications of the plurality of applications is executing properly based on the receipt of the operating state of each of the plurality of applications and the determination of the priority of each of the plurality of applications;
generate a decision as to whether the virtual machine should be restarted based on the determination of whether the desired set of applications of the plurality of applications is executing properly;
detect whether the monitoring agents is registered to provide heartbeat messages to a virtualization controller; and
prevent, based on the detection of whether the monitoring agent is registered and the generation of the decision, the monitoring agent from transmitting a heartbeat message to a virtualization controller prior to expiration of a timeout interval, wherein
the heartbeat message identifies the state of each of the plurality of applications,
the decision-making agent multiplexes multiple application states into a single heartbeat message, and
the virtualization controller is configured to restart the virtual machine if the monitoring agent does not send the heartbeat message prior to expiration of the time interval; and
restart the virtual machine in response to the prevention.

10. The system of claim 9, wherein the program instructions are further executable by the one or more processors to determine that the virtual machine should not be restarted, in response to the information identifying that a higher-priority application of the plurality of applications is executing properly and a lower priority application of the plurality of applications is failed.

11. The system of claim 9, wherein the program instructions are further executable by the one or more processors to determine that the virtual machine should be restarted, in response to the information identifying that a higher-priority application of the plurality of applications is failed and a lower priority application of the plurality of applications is executing properly.

12. The system of claim 9, wherein the program instructions are further executable by the one or more processors to decide to unregister the monitoring agent from providing heartbeat messages to the virtualization controller, in response to the information identifying that the application has been intentionally taken offline.

13. A non-transitory computer readable storage medium comprising program instructions executable by one or more processors to:
receive information indicating an operating state of each of a plurality of applications executing in a virtual machine from a monitoring agent executing in the virtual machine;
determine a priority of each of the plurality of applications by a decision-making agent, wherein the decision-making agent is not executing in the virtual machine;
determine whether a desired set of applications of the plurality of applications is executing properly based on the receipt of the operating state of each of the plurality of applications and the determination of the priority of each of the plurality of applications;
generate a decision as to whether the virtual machine should be restarted based on the determination of whether the desired set of applications of the plurality of applications is executing properly;
detect whether the monitoring agents is registered to provide heartbeat messages to a virtualization controller; and
prevent, based on the detection of whether the monitoring agent is registered and the generation of the decision, the monitoring agent from transmitting a heartbeat message to a virtualization controller prior to expiration of a timeout interval, wherein
the heartbeat message identifies the state of each of the plurality of applications, the decision-making agent multiplexes multiple application states into a single heartbeat message, and the virtualization controller is configured to restart the virtual machine if the monitoring agent does not send the heartbeat message prior to expiration of the time interval; and restart the virtual machine in response to the prevention.

14. The non-transitory computer readable storage medium of claim 13, wherein the program instructions are further executable by the one or more processors to determine that the virtual machine should not be restarted, in response to the information identifying that a higher-priority application of the plurality of applications is executing properly and a lower priority application of the plurality of applications is failed.

15. The non-transitory computer readable storage medium of claim 13, wherein the program instructions are further executable by the one or more processors to determine that the virtual machine should be restarted, in response to the information identifying that a higher-priority application of the plurality of applications is failed and a lower priority application of the plurality of applications is executing properly.

16. The non-transitory computer readable storage medium of claim 13, wherein the program instructions are further executable by the one or more processors to decide to unregister the monitoring agent from providing heartbeat messages to the virtualization controller, in response to the information identifying that the application has been intentionally taken offline.

* * * * *